(No Model.)

J. U. REED.
LATHE OR PLANER TOOL.

No. 442,259. Patented Dec. 9, 1890.

Witnesses:
H. E. Bacharach.
A. B. Jenkins.

Inventor,
John U. Reed
By Simonds & Burdett,
attys

UNITED STATES PATENT OFFICE.

JOHN U. REED, OF HARTFORD, ASSIGNOR OF ONE-HALF TO ALBERT O. REED, OF HIGGANUM, CONNECTICUT.

LATHE OR PLANER TOOL.

SPECIFICATION forming part of Letters Patent No. 442,259, dated December 9, 1890.

Application filed April 28, 1890. Serial No. 349,774. (No model.)

*To all whom it may concern:*

Be it known that I, JOHN U. REED, of Hartford, in the county of Hartford and State of Connecticut, have invented certain new and useful Improvements in Lathe and Planer Tools, of which the following is a full, clear, and exact description, whereby any one skilled in the art can make and use the same.

The object of my invention is to provide a lathe or planer tool with an interchangeable point that shall be comparatively cheap and simple in construction and adapted to all of the uses to which a tool of this class can be put.

To this end my invention consists in details of the several parts making up the device as a whole and in their combination, as more particularly hereinafter described, and pointed out in the claims.

Figure 1:
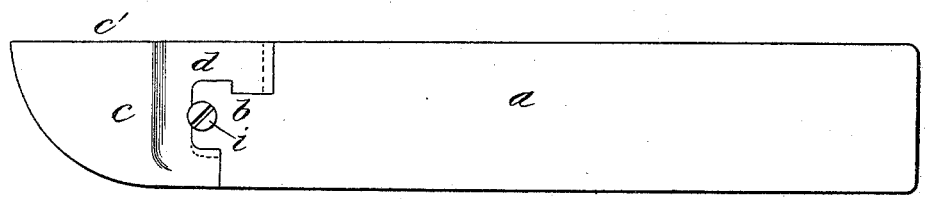
Figure 2:
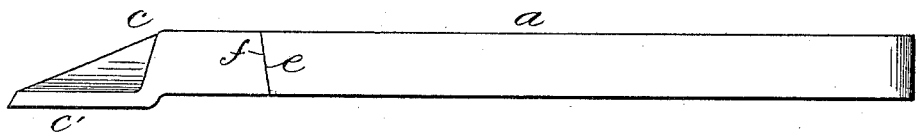
Figure 3:
Figure 4:
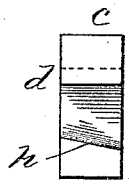

Referring to the drawings, Figure 1 is a side view of a lathe-tool embodying my invention. Fig. 2 is a top view of the same. Fig. 3 is a detail view of the front end of the shank. Fig. 4 is a detail view of the rear end of the point.

In the accompanying drawings, the letter $a$ denotes the shank, that is usually of tool-steel and forged or otherwise formed to shape and having at its front end the engaging or locking means $b$. This shank is usually of uniform size in cross-section to enable it to be readily inserted and clamped in a tool-holder, and is of usual form and construction except as to the front end. The point $c$ may be a side tool, cutting-off tool, right or left or diamond-point, or any other convenient or desirable form of tool adapted to cutting and shaping metal either in a lathe or in a planer. The point is composed of only so much of the tool as will enable the immediate cutting part $c'$ to be properly shaped and afford a sufficient amount of material for the formation of the locking means $d$, that correspond and fit into the locking means $b$ on the shank, these interengaging parts being so formed as to enable the parts to be put together laterally. When the parts are engaged, they are directly in line, the side and edge surfaces being substantially in the same plane.

The locking means consist of what practically amounts to a dovetailed projection on the one part fitting into a dovetailed socket on the other part, the object being to so form the engaging parts that when the shank and point are put together for the purpose of making a complete tool the form of at least two of the contact-surfaces shall be such as to firmly clamp the parts together lengthwise of the tool, while the form of one of the surfaces that is at substantially right angles to the other shall be so inclined as to draw the parts together and bind them depthwise of the tool.

The means adopted in the form of my improvement herein illustrated is to form the crosswise surface $e$ on the end of the shank on a taper or angle, and the corresponding surface $f$ (which when the parts are together bears directly against the surface $e$) is formed on a like taper. When the parts are driven laterally together, these sloping surfaces operate to bind the shank and point together and form a firm joint lengthwise of the tool. At another part—that is, preferably on one of the crosswise surfaces, as $g$, on the end of the shank—there is formed an inclined surface that is placed at an angle and engages with a like sloping surface $h$ formed on the point, so that these two surfaces when the point and shank are forced together operate to bind them together depthwise of the tool. It is possible to construct the engaging means so that this result of a firm binding together of the shank and removable point both lengthwise and depthwise of the tool may be effected by surfaces somewhat different in form and location from those herein described, and I do not limit my invention to the specific form and location of the binding-surfaces as is shown.

It has been proved by careful experiment and tests on extremely heavy work, both in lathe and planer, that the locking means in a tool as herein described are ample to endure the strain of any work equally well as though the tool was solid from end to end. As an additional protection, however, a clamping-screw $i$ is seated in a socket on the side of the shank with its head overhanging the side of the point, and this serves to prevent any possible accidental separation of the shank and point.

The several parts composing the tool may be made by drop forging, the locking means being formed by milling or otherwise forming them to shape.

I claim as my invention—

1. In a lathe or planer tool, in combination, a shank having on one end locking means with a tapered clamping-surface and a laterally-removable point having corresponding locking means with tapered clamping-surface, all substantially as described.

2. The improved lathe-tool consisting of a shank having on one end locking means with tapered surfaces lying in different planes and a laterally removable and renewable point having corresponding locking parts and tapered surfaces that operate to bind the parts together both lengthwise and depthwise of the tool, all substantially as described.

3. In a lathe or planer tool, in combination with a shank having on one end the crosswise locking means, a renewable point having corresponding locking means, whereby the parts are fitted together laterally of the tool, and a locking-screw borne in one part with its head overhanging the other part at the joint, all substantially as described.

JOHN U. REED.

Witnesses:
CHAS. L. BURDETT,
ARTHUR B. JENKINS.